US011938867B1

(12) United States Patent
McIntosh

(10) Patent No.: US 11,938,867 B1
(45) Date of Patent: Mar. 26, 2024

(54) RETAINER FOR A MOBILE DEVICE AND METHOD OF USE THEREOF

(71) Applicant: Cell Phone Seat LLC, Franklin, TN (US)

(72) Inventor: Scott J. McIntosh, Franklin, TN (US)

(73) Assignee: Cell Phone Seat LLC, Franklin, TN (US)

( * ) Notice: Subject to any disclaimer, the term of this patent is extended or adjusted under 35 U.S.C. 154(b) by 0 days.

(21) Appl. No.: 18/235,569

(22) Filed: Aug. 18, 2023

Related U.S. Application Data

(60) Provisional application No. 63/462,180, filed on Apr. 26, 2023.

(51) Int. Cl.
*B60R 11/02* (2006.01)
*B60R 11/00* (2006.01)

(52) U.S. Cl.
CPC ... *B60R 11/0241* (2013.01); *B60R 2011/0071* (2013.01)

(58) Field of Classification Search
CPC ................ H04M 1/04; B60R 11/0241; B60R 2011/0071
See application file for complete search history.

(56) References Cited

U.S. PATENT DOCUMENTS

| | | | |
|---|---|---|---|
| 5,745,565 A | 4/1998 | Wakefield | |
| 5,825,874 A | 10/1998 | Humphreys et al. | |
| 6,396,925 B1 | 5/2002 | Close | |
| 6,533,233 B2 | 3/2003 | Thomas | |
| 8,550,550 B2 | 10/2013 | Cassese et al. | |
| 9,221,376 B2 | 12/2015 | Baker | |
| 9,819,377 B1 | 11/2017 | Singh et al. | |

(Continued)

FOREIGN PATENT DOCUMENTS

| | | |
|---|---|---|
| CN | 302702787 | 1/2014 |
| CN | 307083164 | 1/2022 |

(Continued)

OTHER PUBLICATIONS

U.S. Appl. No. 29/856,626, filed Oct. 15, 2022, Scott J. Mcintosh.

(Continued)

*Primary Examiner* — Tuan D Nguyen
(74) *Attorney, Agent, or Firm* — Baker, Donelson, Bearman, Caldwell & Berkowitz, P.C.; Dominic A. Rota; Edward D. Lanquist, Jr.

(57) ABSTRACT

A retainer for a mobile device is disclosed. The retainer may have a base defined by an open-sided resilient wall, which is capable of flexible and removable engagement to an internal surface of a container insert. An arm may extend vertically upward from the base and may support a holder. The holder may be positioned over the base. The holder may have a bottom wall, a front wall extending upwardly from the bottom wall, a rear wall extending upwardly from the bottom wall opposite of the front wall, and opposite side walls extending upwardly from the bottom wall and interconnecting the front wall and the rear wall, wherein the rear wall has a height lesser than a height of the front wall. The bottom wall, the front wall, the rear wall, and the opposite sidewalls defining a space configured to receive and retain the mobile device.

20 Claims, 10 Drawing Sheets

(56) References Cited

U.S. PATENT DOCUMENTS

| | | | |
|---|---|---|---|
| 10,576,905 | B1 | 3/2020 | MacNeil et al. |
| 10,717,396 | B2 | 7/2020 | MacNeil et al. |
| D970,494 | S | 11/2022 | Mcintosh |
| 2001/0032791 | A1 | 10/2001 | Hudson |
| 2008/0019082 | A1 | 1/2008 | Krieger et al. |
| 2010/0314387 | A1 | 12/2010 | Cassese et al. |
| 2014/0170977 | A1 | 6/2014 | Ryan et al. |
| 2015/0232042 | A1 | 8/2015 | Baker |
| 2018/0072210 | A1 | 3/2018 | Huelke et al. |
| 2019/0357688 | A1* | 11/2019 | Dobson ............... A47C 7/624 |
| 2020/0130604 | A1 | 4/2020 | MacNeil et al. |
| 2021/0237661 | A1* | 8/2021 | Stefanelli ............ B60R 11/0241 |
| 2023/0039211 | A1* | 2/2023 | Edwards ................ B60R 7/084 |

FOREIGN PATENT DOCUMENTS

| | | |
|---|---|---|
| CN | 307424360 | 6/2022 |
| EM | 002926394 | 12/2015 |
| EM | 007846795 | 4/2020 |
| GB | 9007846795 | 4/2020 |
| KR | 300735631 | 3/2014 |
| KR | 101407844 | 6/2014 |
| KR | 102113123 | 5/2020 |

OTHER PUBLICATIONS

Amazon, "BulbHead Official As Seen On TV Cup Call Cup Holder Phone Mount for Car Adjustable Cell Phone Holder Fits Any Phone in Any Cup Holder—Rotates 360°, Tilts & Moves Left or Right" https://www.amazon.com/Seen-Holder-Phone-Mount-BulbHead/dp/B07Z6RS35R/ (Oct. 16, 2019).

Kickstarter, "Cell Phone Seat—A Simple Cell Phone Holder For Your Car," https://www.kickstarter.com/projects/cellphoneseat/cell-phone-seat-a-simple-cell-phone-holder-for-you/description (Sep. 13, 2020).

The Home of Bright Ideas, "Ultimate Cell Phone Mount Fits Any Car Cup Holder," https://shopify.bulbhead.com/products/cup-call (first appears on Archive.org on Sep. 20, 2020).

Weathertech, "Weather Tech CupFone," https://www.weathertech.com/products/weathertech-cupfone/?utm_source=BingAds&utm_medium=CPC&utm_campaign=CupFone-Brand&msclkid=2db460fb5ac81cdca76f3f58753cb454 (accessed Aug. 21, 2023).

* cited by examiner

RETAINER FOR A MOBILE DEVICE AND METHOD OF USE THEREOF

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

CROSS-REFERENCES TO RELATED APPLICATIONS

The present application claims priority to, and benefit from, a U.S. provisional patent application filed on Apr. 26, 2023, identified as U.S. Appl. No. 63/462,180, and which is incorporated by reference in its entirety.

FIELD OF THE DISCLOSURE

The present disclosure relates generally to a retainer for a mobile device, and more particularly, a retainer for a mobile device configured for easily and securely holding a mobile device in a container insert, such as a cup holder of a vehicle.

BACKGROUND

A variety of devices have been proposed over the years for securing, mounting, or otherwise temporarily holding a mobile device, such as a mobile (or cell) phone, in a container insert, such as a cup holder. In the context of vehicles, a variety of devices have been developed for holding a phone in a vehicle, for the purpose of promoting safe operation of the vehicle while being able to view and access the phone. Common versions of such retainer devices, often referred to as "cell phone holders," mount on a front windshield of the vehicle via suction cup, on the dash via a base that is itself secured by a magnet or adhesive, or on an air vent or other feature using a base with a correspondingly configured snap-clip, bracket, or the like. Such designs have a number of drawbacks in terms of cost and complexity, and each suffer from blocking a driver's view through a front windshield or view of and/or access to dash displays and controls, blocking and adversely affecting operation of the air vents, or adversely affecting or marring dash features.

More recently, cell phone holders have been proposed that are mounted or seated within a cup holder of the vehicle. In most such designs, the cell phone holder occupies all, or a substantial portion, of the cup holder, thereby preventing the cup holder from any longer functioning as such. See, e.g., U.S. Pat. No. 6,396,925 to Close entitled "Cellular Phone Holding Device," U.S. Pat. App. Pub. No. 2008/0019082 to Kreiger et al. (Black & Decker, Inc.) entitled "Docking Station for a Portable Device," and most recently U.S. Pat. Nos. 10,576,905 and 10,717,396 to MacNeil et al. (MacNeil IP LLC/WeatherTech) entitled "Vehicle Cup Holder Cell Phone Mount." In each case, such cell phone holders fit within the cup holder such that a beverage can no longer be placed in the cup holder. With cup holders in vehicles often being a "premium," forfeiting a cup holder in order to safely and securely mount a cell phone is not a preferred option for a driver or passenger of a vehicle. Moreover, such cell phone holder devices that occupy all, or a substantial portion, of the cup holder typically involve relatively complex and costly bases that involve numerous parts, whether or not moving, in order to accommodate the variety of cup holders found across vehicle makes and models.

A few cell phone holders have also been proposed that still allow for holding a beverage container while supporting a cell phone, but such prior designs have a number of drawbacks. For example, as shown in U.S. Pat. No. 5,745,565 to Wakefield entitled "Combination Cup and Cellular Phone Holder," the disclosed device encompasses a beverage container holder having an attached cell phone holder, such that disadvantageously the beverage container holder's tapered cylindrical wall nests within the existing vehicle cup holder, thereby greatly reducing the size and shape of beverage containers that can then be housed. And, with the cell phone holder being an adjacent downwardly projecting cradle, this allows only for storage of the phone but not viewing or access without removal of the phone-somewhat defeating the purpose of having a cell phone holder in a vehicle. Thus, this renders the design highly impractical on a number of levels. More recently, U.S. Pat. App. Pub. No. 2018/0072210 to Huelke et al. (Ford Global Technologies, LLC), entitled "Cup Holder Insert," discloses a device having a central support receiver for installation in the vehicle cup holder while still accepting a beverage container and further having one or more secondary holders extending from the central support receiver for holding one or more additional beverage container and/or an electronic device such as a cellular phone. The device, however, is not universal in engaging a variety of sizes, shapes, and locations of vehicle cup holders, and it is relatively bulky and costly insofar as it incorporates various components and moving parts and even electrical contacts or connectors for optionally charging an electronic device inserted within one of the holders.

Furthermore, whether configured for installation on the windshield or dash, in a cup holder, or on or in some other location, such vehicle cell phone holders typically involve a relatively complex spring-biased clamping, ratcheting, or other such mechanism that clamps on or otherwise facilitates securely or immovably mounting a cell phone on or in the cell phone holder. Given the number of constituent pieces in these devices, such devices are relatively costly and have a number of additional drawbacks in use, such as not allowing access to tactile buttons along one or both side edges of the cell phone or not easily dislodging and holding the phone, often requiring two hands to do so. Other cell phone holders involve a piece of hardware or magnet or other such component to be adhesively or otherwise installed on the back of the phone or phone case for removable engagement with the cell phone holder. While such phone mounting components may, in some cases, involve fewer parts and thus less complexity and cost in mounting the phone in the vehicle and may even not impair access to tactile side buttons of the phone or require two hands to engage or disengage the phone from the holder, such alternate arrangement has the disadvantage of having to semi-permanently install a piece of hardware on the back of the phone or phone case. Thus, this alternate arrangement generally requires that such hardware remains on the back of the phone even when it is not mounted in the vehicle.

Given the number of drawbacks associated with cell phone holders, and in particular, those cell phone holders configured for installation in cup holders of vehicles, there is a need to provide a retainer for a mobile device that overcomes the foregoing limitations.

BRIEF SUMMARY

The present disclosure addresses and/or provides advantages over the problems identified above, amongst others.

Implementations consistent with the present disclosure provide a retainer for a mobile device that is universal to retainer inserts, such as cup holders for vehicles, and which is further mountable within, engageable, or configured to accommodate a variety of retainer inserts, without limiting the use of the retainer insert and without requiring separate moving parts or components. Moreover, the present disclosure provides a retainer for a mobile device that allows a user of the mobile device, such as a driver or passenger of a vehicle, to view a display of the mobile device, where the retainer does not obstruct a driver or passenger's view from safe operation of the vehicle or access to controls on a vehicle's dash.

In the context of a retainer for a mobile device, a retainer for a mobile device is provided herein. The retainer may comprise a base, an arm, and a holder. The base may be defined by an open-sided resilient wall. The open-sided resilient wall may be capable of flexible and removable engagement to an internal surface of a container insert, whereby the container insert allows for removable receipt of a beverage container. The arm may extend vertically upward from the base and support a holder, whereby the holder may be positioned over the base. The holder may have a bottom wall, a front wall, a rear wall, and opposite side walls. The front wall may extend upwardly from the bottom wall, the rear wall may extend upwardly from the bottom wall opposite of the front wall, and the opposite side walls may extend upwardly from the bottom wall and interconnect the front wall and the rear wall. The front wall may have a front wall top edge defining a front wall height, and the rear wall may have a rear wall top edge defining a rear wall height. The rear wall height may be greater than the front wall height. The bottom wall, the front wall, the rear wall, and the opposite sidewalls may define a space. The space may be configured to receive and retain the mobile device by having the mobile device frictionally engaged to the bottom wall and at least one or more of the front wall, the rear wall, or at least one of the opposite side wall.

In the context of a retainer for a mobile device, another retainer for a mobile device is provided herein. The retainer may comprise a base, an arm, and a holder. The base may be defined by an open-sided resilient wall. The open-sided resilient wall may be capable of flexible and removable engagement to an internal surface of a container insert, whereby the container insert allows for removable receipt of a beverage container. The arm may extend vertically upward from the base and support a holder, whereby the holder may be positioned over the base. The holder may have a bottom wall, a front wall, and a rear wall. The front wall may extend upwardly from the bottom wall, and the rear wall may extend upwardly from the bottom wall opposite of the front wall. The front wall may have a front wall top edge defining a front wall height, and the rear wall may have a rear wall top edge defining a rear wall height. The rear wall height may be greater than the front wall height. The rear wall may have a rear wall notch adjacent to the bottom wall, and the rear wall may have a resilient retainer tab protruding forward forwardly and downwardly from the rear wall notch toward the bottom wall. The bottom wall, the front wall, and the rear wall may define a space. The space may be configured to receive and retain the mobile device by having the resilient retainer tab engage a bottom end of the mobile device, whereby the mobile device leans back against the rear wall and is frictionally engaged against the front wall.

In the context of a retainer for a mobile device, yet another retainer for a mobile device is provided herein. The retainer may comprise an arm, a base, and a holder. The arm may have an upper end and a lower end. The upper end of the arm may be distally located from the lower end of the arm. The base may be connected to the arm at the lower end of the arm. The base may be defined by an open-sided flexible wall, which may be capable of accommodating a perimeter of an internal surface of a container insert, whereby the container insert may allow for insertion and removal of a beverage container. The holder may be connected to the arm at the upper end of the arm, and the holder may be located above the base. The holder may have a bottom wall, a front wall, a rear wall, and opposite side walls. The front wall may extend upwardly from the bottom wall, and the rear wall may extend upwardly from the bottom wall opposite of the front wall. The opposite side walls may extend upwardly from the bottom wall and interconnect the front wall and the rear wall. The front wall may have a height that is lesser than a height of the rear wall. The bottom wall, the front wall, the rear wall, and the opposite sidewalls may be configured to receive the mobile device, and may be further configured to retain the mobile device when the mobile device is frictionally engaged to the bottom wall and at least one or more of the front wall, the rear wall, or at least one of the opposite side walls.

In a particular embodiment, a retainer for a mobile device is disclosed. The retainer comprises a base, an arm, and a holder. The base is defined by an open-sided resilient wall. The open-sided resilient wall is capable of flexible and removable engagement to an internal surface of a container insert such that the container insert allows for removable receipt of a beverage container. The arm extends vertically upward from the base and supports a holder, whereby the holder is positioned over the base. The holder has a bottom wall, a front wall, a rear wall, and opposite side walls. The front wall extends upwardly from the bottom wall, and the rear wall extends upwardly from the bottom wall opposite of the front wall. The opposite side walls extend upwardly from the bottom wall and interconnect the front wall and the rear wall. The front wall has a front wall top edge defining a front wall height, and the rear wall has a rear wall top edge defining a rear wall height. The rear wall height is greater than the front wall height. The bottom wall, the front wall, the rear wall, and the opposite sidewalls define a space. The space is configured to receive and retain the mobile device by having the mobile device frictionally engaged to the bottom wall and at least one or more of the front wall, the rear wall, or at least one of the opposite side wall.

In one aspect according to the above-referenced embodiment, the open-sided resilient wall may be formed in the shape of the letter "C."

In another aspect according to the above-referenced embodiment, the space may be configured to receive and retain the mobile device in a vertical orientation.

In another aspect according to the above-referenced embodiment, each of the opposite side walls may have an upwardly opening side wall notch configured to receive and retain the mobile device in a horizontal orientation.

As an exemplary aspect according to the above-referenced embodiment, the upwardly opening side wall notch of each of the opposite side may be rearwardly angled in a direction of the rear wall.

In another aspect according to the above-referenced embodiment, each of the opposite side walls may have a vertically inwardly projecting side wall rib extending upwardly from the bottom wall, whereby the projecting side wall rib of each of the opposite side walls allows for frictional engagement of the mobile device in the space.

In another aspect according to the above-referenced embodiment, the bottom wall may have a forwardly opening bottom wall notch. The front wall may have a front wall notch, whereby the front wall notch may intersect, and be coextensive with, the bottom wall notch. The bottom wall notch and the front wall notch may cooperate to allow for receipt of a cable in the space, the cable configured to be plugged into the mobile device when the mobile device is received and retained by the space in a vertical orientation.

In another particular embodiment, a retainer for a mobile device is disclosed. The retainer comprises a base, an arm, and a holder. The base is defined by an open-sided resilient wall. The open-sided resilient wall is capable of flexible and removable engagement to an internal surface of a container insert such that the container insert allows for removable receipt of a beverage container. The arm extends vertically upward from the base and supports a holder, whereby the holder is positioned over the base. The holder has a bottom wall, a front wall, and a rear wall. The front wall extends upwardly from the bottom wall, and the rear wall extends upwardly from the bottom wall opposite of the front wall. The front wall has a front wall top edge defining a front wall height, and the rear wall has a rear wall top edge defining a rear wall height. The rear wall height is greater than the front wall height. The rear wall has a rear wall notch adjacent to the bottom wall, and the rear wall has a resilient retainer tab protruding forward forwardly and downwardly from the rear wall notch toward the bottom wall. The bottom wall, the front wall, and the rear wall defines a space. The space is configured to receive and retain the mobile device by having the resilient retainer tab engage a bottom end of the mobile device, such that the mobile device leans back against the rear wall and is frictionally engaged against the front wall.

In one aspect according to the above-referenced embodiment, the open-sided resilient wall may be formed in the shape of the letter "C."

In another aspect according to the above-referenced embodiment, the resilient retainer tab may extend into the space at a point located generally halfway between the rear wall and the front wall.

In another aspect according to the above-referenced embodiment, the resilient retainer tab may extend into the space at an angle of approximately thirty degrees (30°) relative to the rear wall.

In another aspect according to the above-referenced embodiment, the resilient retainer tab is formed, such that the resilient retainer tab may have a forwardly projecting retainer tab nub.

In another aspect according to the above-referenced embodiment, the holder may further comprise opposite side walls extending upwardly from the bottom wall and interconnecting the front wall and the rear wall. The bottom wall, the front wall, the rear wall, and the opposite side walls may define the space.

In yet another particular embodiment, a retainer for a mobile device is disclosed. The retainer comprises an arm, a base, and a holder. The arm has an upper end and a lower end. The upper end of the arm is distally located from the lower end of the arm. The base is connected to the arm at the lower end of the arm. The base is defined by an open-sided flexible wall, which is capable of accommodating a perimeter of an internal surface of a container insert, whereby the container insert allows for insertion and removal of a beverage container. The holder is connected to the arm at the upper end of the arm, and the holder is located above the base. The holder has a bottom wall, a front wall, a rear wall, and opposite side walls. The front wall extends upwardly from the bottom wall, and the rear wall extends upwardly from the bottom wall opposite of the front wall. The opposite side walls extend upwardly from the bottom wall and interconnect the front wall and the rear wall. The front wall has a height that is lesser than a height of the rear wall. The bottom wall, the front wall, the rear wall, and the opposite side walls are configured to receive the mobile device, and are further configured to retain the mobile device when the mobile device is frictionally engaged to the bottom wall and at least one or more of the front wall, the rear wall, or at least one of the opposite side walls.

In one aspect according to the above-referenced embodiment, the open-sided flexible wall may be formed in the shape of the letter "C."

In another aspect according to the above-referenced embodiment, the arm may extend from the lower end of the arm to the upper end of the arm in a manner substantially vertical relative to the base.

In another aspect according to the above-referenced embodiment, the arm may have a first member contiguously formed with a second member, wherein the first member is proximate to the lower end and the second member proximate to the upper end. The first member may extend substantially vertical relative to the base, and the second member may extend at an angle relative to the first member.

As an exemplary aspect according to the above-referenced embodiment, the second member may extend at an angle ranging from about fifteen degrees (15°) to about twenty-five degrees (25°) relative to the first member.

In another exemplary aspect according to the above-referenced embodiment, the holder may be substantially offset from the base, such that access to insert and remove the beverage container in the container insert is not obstructed by the holder.

In a further particular embodiment, a retainer for a mobile device is disclosed. The retainer comprises an arm, a base, and a holder. The arm has a lower end, an upper end, and an intermediate portion. The upper end is distally located from the lower end, and the intermediate portion is located between the lower end of the arm and the upper end of the arm. The arm has a first member and a second member. The first member is proximate to the lower end of the arm, and the second member is proximate to the upper end of the arm. The first member is removably attached to the second member at the intermediate portion of the arm. The base is connected to the first member at the lower end of the arm. The base is defined by an open-sided flexible wall, which is capable of accommodating a perimeter of an internal surface of a container insert, whereby the container insert allows for insertion and removal of a beverage container. The holder is connected to the arm at the upper end of the arm, and the holder is located above the base. The holder has a bottom wall, a front wall, a rear wall, and opposite side walls. The front wall extends upwardly from the bottom wall, and the rear wall extends upwardly from the bottom wall opposite of the front wall. The opposite side walls extend upwardly from the bottom wall and interconnect the front wall and the rear wall. The front wall has a height that is lesser than a height of the rear wall. The bottom wall, the front wall, the rear wall, and the opposite side walls are configured to receive the mobile device, and are further configured to retain the mobile device when the mobile device is frictionally engaged to the bottom wall and at least one or more of the front wall, the rear wall, or at least one of the opposite side walls.

Unless otherwise defined, all technical and scientific terms used herein have the same meaning as commonly understood by one of ordinary skill in the art to which this disclosure belongs. The present disclosure may be embodied in other specific forms without departing from the spirit or essential attributes thereof, and it is therefore desired that the embodiments of the disclosure be considered in all aspects as illustrative and not restrictive. Any headings utilized in the description are for convenience only and no legal or limiting effect. Numerous objects, features, and advantages of the embodiments set forth herein will be readily apparent to those skilled in the art upon reading of the following disclosure when taken in conjunction with the accompanying drawings.

BRIEF DESCRIPTION OF THE DRAWINGS

Hereinafter, various exemplary embodiments of the disclosure are illustrated in more detail with reference to the drawings.

DETAILED DESCRIPTION

Figure 1:
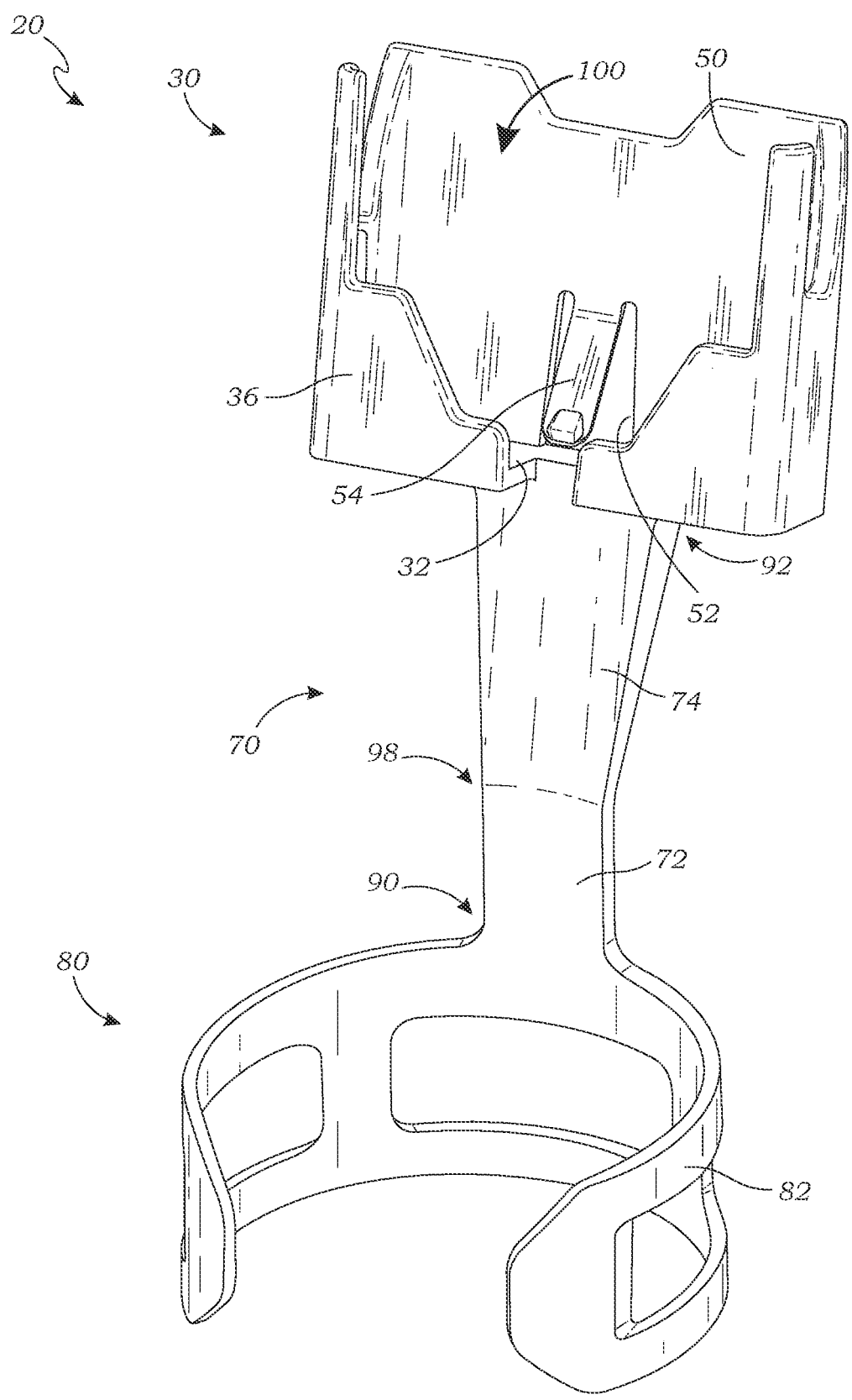
FIG. 1 is a perspective view of an exemplary embodiment of a retainer for a mobile device, in accordance with the present disclosure.

Reference will now be made in detail to embodiments of the present disclosure, one or more drawings of which are set forth herein. Each drawing is provided by way of explanation of the present disclosure and is not a limitation. In fact, it will be apparent to those skilled in the art that various modifications and variations can be made to the teachings of the present disclosure without departing from the scope of the disclosure. For instance, features illustrated or described as part of one embodiment can be used with another embodiment to yield a still further embodiment.

While the inventive subject matter is susceptible of various modifications and alternative embodiments, certain illustrated embodiments thereof are shown in the drawings and will be described below in detail. It should be understood, however, that there is no intention to limit the disclosure to any specific form disclosed, but on the contrary, the inventive subject matter is to cover all modifications, alternative embodiments, and equivalents falling within the scope of any appended claims. The specific embodiments discussed herein are merely illustrative of specific ways to make and use the invention and do not delimit the scope of the disclosure.

Thus, it is intended that the present disclosure covers such modifications and variations as come within the scope of the appended claims and their equivalents. Other objects, features, and aspects of the present disclosure are disclosed in, or are obvious from, the following detailed description. It is to be understood by one of ordinary skill in the art that the present discussion is a description of exemplary embodiments only and is not intended as limiting the broader aspects of the present disclosure. Referring generally to FIGS. 1-10B, various exemplary embodiments of a retainer 20 for a mobile device P may be described in detail. Where the various figures may describe embodiments sharing various common elements and features with other embodiments, similar elements and features are given the same reference numerals and redundant description thereof may be omitted below.

Referring to FIG. 1, provided is an exemplary embodiment of the retainer 20. The retainer 20 may include a base 80, a holder 30, and an arm 70. The retainer 20, or any one or more of the components of the retainer 20, such as the base 80, the holder 30, or the arm 70, may be formed by appropriate materials and methods of construction now known or later developed may be employed. By way of example, the retainer 20, or any one or more of the components of the retainer 20 (and the subcomponents thereof), may be formed of various materials, including (but not limited) to metals such as lightweight steel, aluminum, alloys, and the like, and/or a variety of plastics or polymers such as polypropylene, polystyrene, polyvinyl chloride ("PVC"), acrylonitrile butadiene styrene ("ABS"), polyethylenes, such as high density polyethylene ("HDPE") and low density polyethylene ("LDPE"), polycarbonate, polyurethane, and other such plastics, thermoplastics, thermosetting polymers, and the like, or combinations thereof, any such components being fabricated or formed as through injection molding, casting, extrusion, machining, stamping, forming, or any other such technique now known or later developed. Relatedly, such components of the retainer 20 may be formed integrally, such as forming the entire retainer 20 from a single molding operation, or may be formed separately and then assembled in any appropriate secondary operation employing any assembly technique now known or later developed, including but not limited to fastening, bonding, welding, over-molding or coining, press-fitting, snapping, or any other such technique now known or later developed. Those skilled in the art may appreciate that any such materials and methods of construction are encompassed within the scope of the disclosure, whether now known or later developed, any exemplary materials and methods in connection with any and all embodiments thus being illustrative and non-limiting. By way of illustration and not limitation, the retainer 20 may be formed in a single molding operation from acrylonitrile butadiene styrene ("ABS") in a variety of colors.

Figure 9:
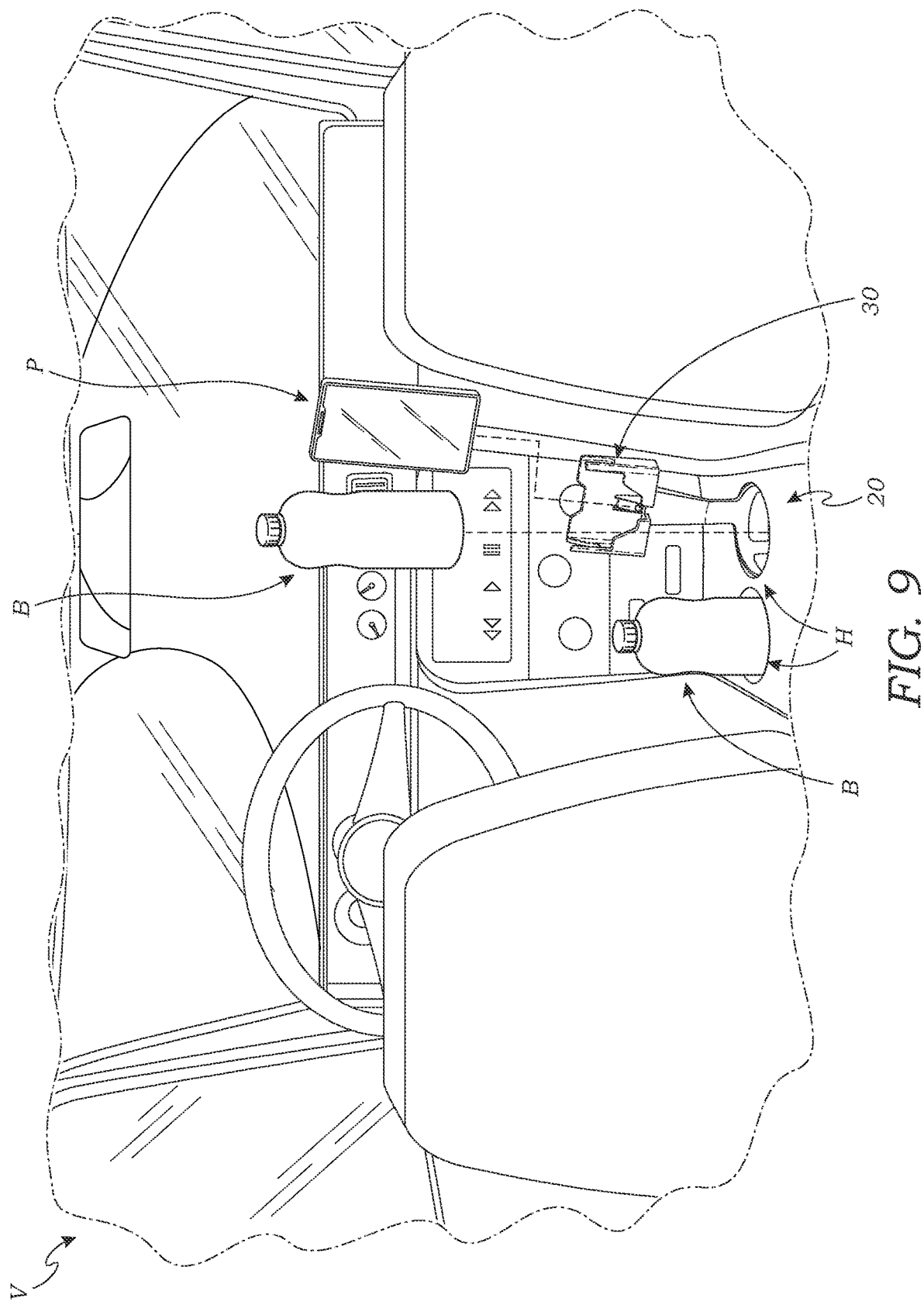
FIG. 9 is a reduced scale perspective view of an exemplary embodiment of the retainer for the mobile device, as installed in a retainer insert, e.g., a cup holder, in a vehicle in a second operational mode, in accordance with the present disclosure.
Figures 10A, 10B:
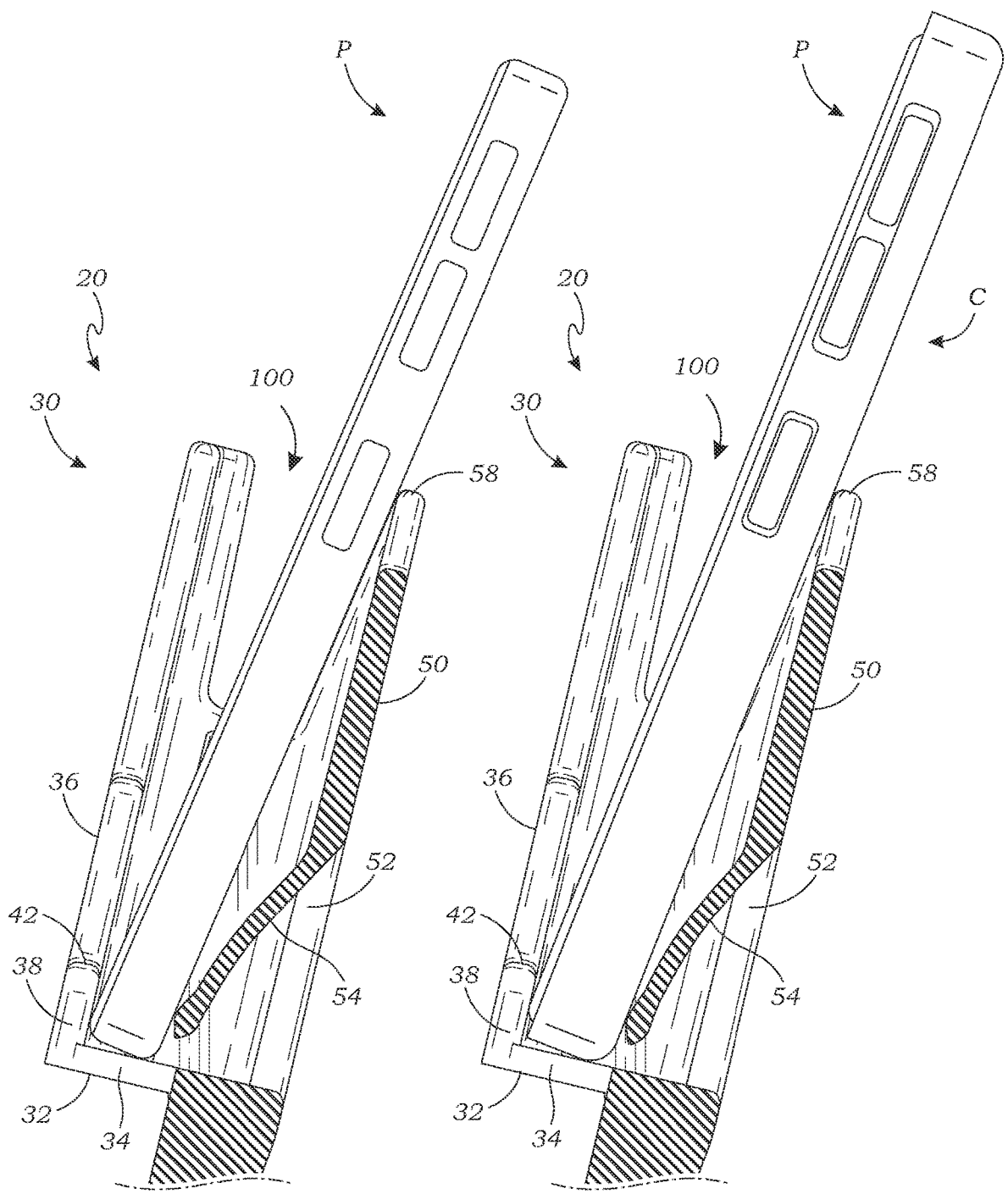
FIG. 10A is an enlarged cross-sectional partial side view of an exemplary embodiment of the retainer for the mobile device, as taken from line 6-6 of FIG. 2, in the second operational mode of FIG. 9, with a first exemplary mobile device, in accordance with the present disclosure.
FIG. 10B is an enlarged cross-sectional partial side view of an exemplary embodiment of the retainer for the mobile device, as taken from line 6-6 of FIG. 2, in the second operational mode of FIG. 9, with a second exemplary mobile device, in accordance with the present disclosure.

Again referring to FIG. 1, provided is a perspective view of an exemplary embodiment of the retainer 20 according to aspects of the present disclosure. The retainer 20 generally comprises the base 80, the arm 70, and the holder 30. As discussed further below, the holder 30 is configured for selective receipt and support of the mobile device P, as shown in FIGS. 9-10. For the purpose of this disclosure, while the terms "mobile device," "phone," or "cell phone," are used throughout, it will be appreciated that such terms are to have a broad interpretation as including any electronic communication device now known or later developed, including but not limited to mobile (cell) phones, smart phones, personal digital assistant (PDA), portable tablet, or the like. And, further for purpose of this disclosure, when referring to a "mobile device," "phone," or "cell phone," any of the foregoing may be covered (in whole or in part) by a protective outer layer, or a casing, such as a mobile device protector C, or a phone case C (as depicted in FIG. 10B).

Figure 8:
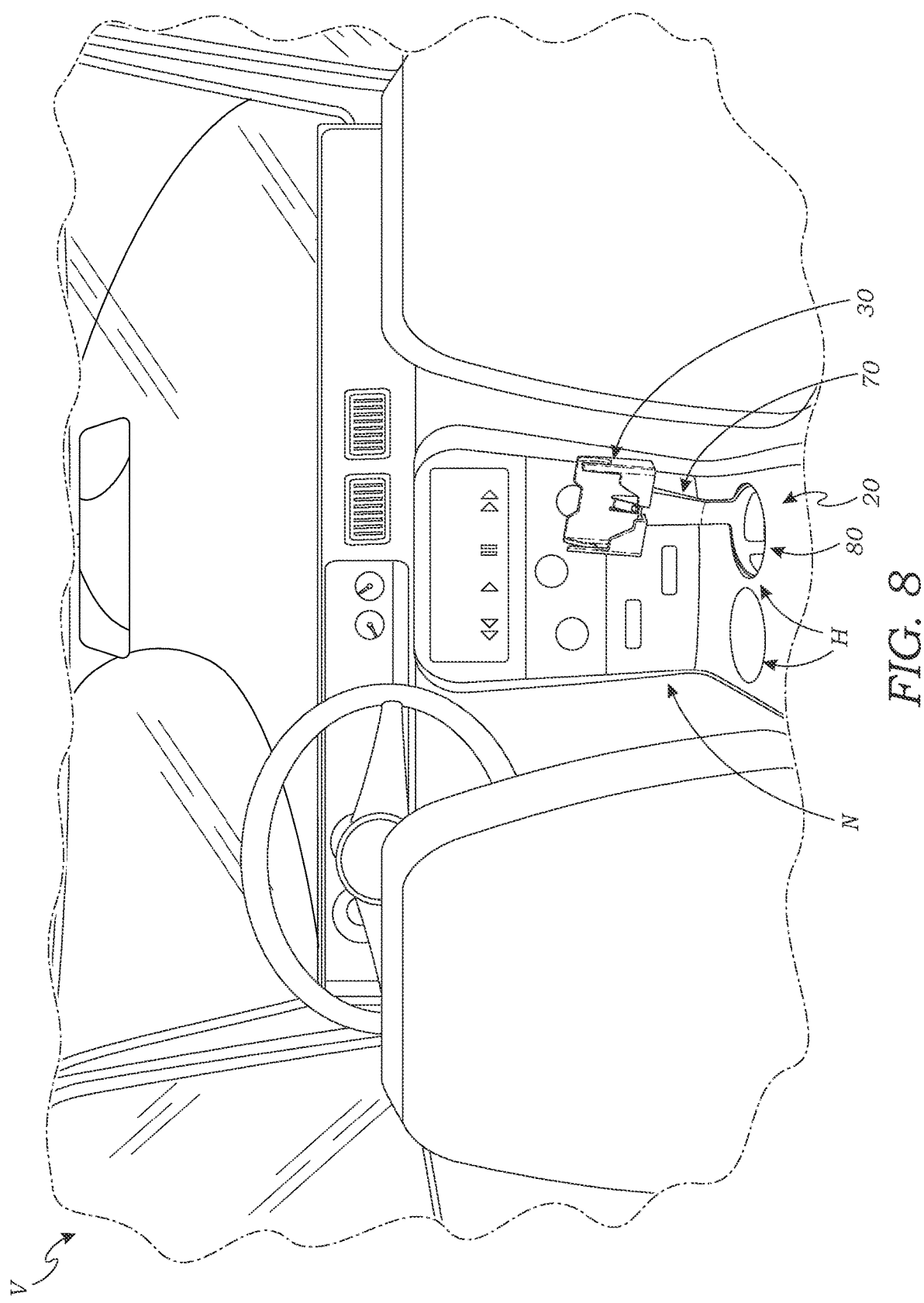
FIG. 8 is a reduced scale perspective view of an exemplary embodiment of the retainer for the mobile device, as installed in a retainer insert, e.g., a cup holder, in a vehicle in a first operational mode, in accordance with the present disclosure.

The base 80 may be defined by an open-sided wall 82 having resiliency, flexibility, or substantial shape memory. The open-sided resilient wall 82 may be capable of flexible and removable engagement to an internal surface of a container insert H, such as a cup holder H (as depicted in FIGS. 8-9). For the purpose of the disclosure, the container insert H may be any holder, or insert, for a beverage container B (as discussed below), including cup holders in vehicles (as shown in FIGS. 8-9), luxury seats (e.g., movie-theatre seats), or the like. The open-sided resilient wall 82 may be flexible so as to allow for expansion (e.g., widening) or contraction (e.g., narrowing), whereby the open-sided resilient wall 82 is capable of accommodating a given perimeter of an internal surface of the container insert H. The open-sided resilient wall 82 may be formed in the shape of the letter "C," or any other letter or geometry that supports or provides flexible accommodation to an internal surface of the container insert H. With the open-sided resilient wall 82 of the base 80 flexibly accommodating a given perimeter of an internal surface of the container insert H, a user of the mobile device P may be capable of inserting and removing a beverage container B, as depicted in FIG. 9. In other words, the open-sided resilient wall 82 of the base 80 may still allow for removable receipt of the beverage container B. For the purpose of the disclosure, while the term "beverage container" is used throughout, it will be appreciated that such terms are to have a broad interpretation as including any container or enclosure, such as a bottle, capable of storing items or perishable goods, such as a beverage or food, and such container or enclosure being capable of fitting or housing within the container insert H.

Figure 5:
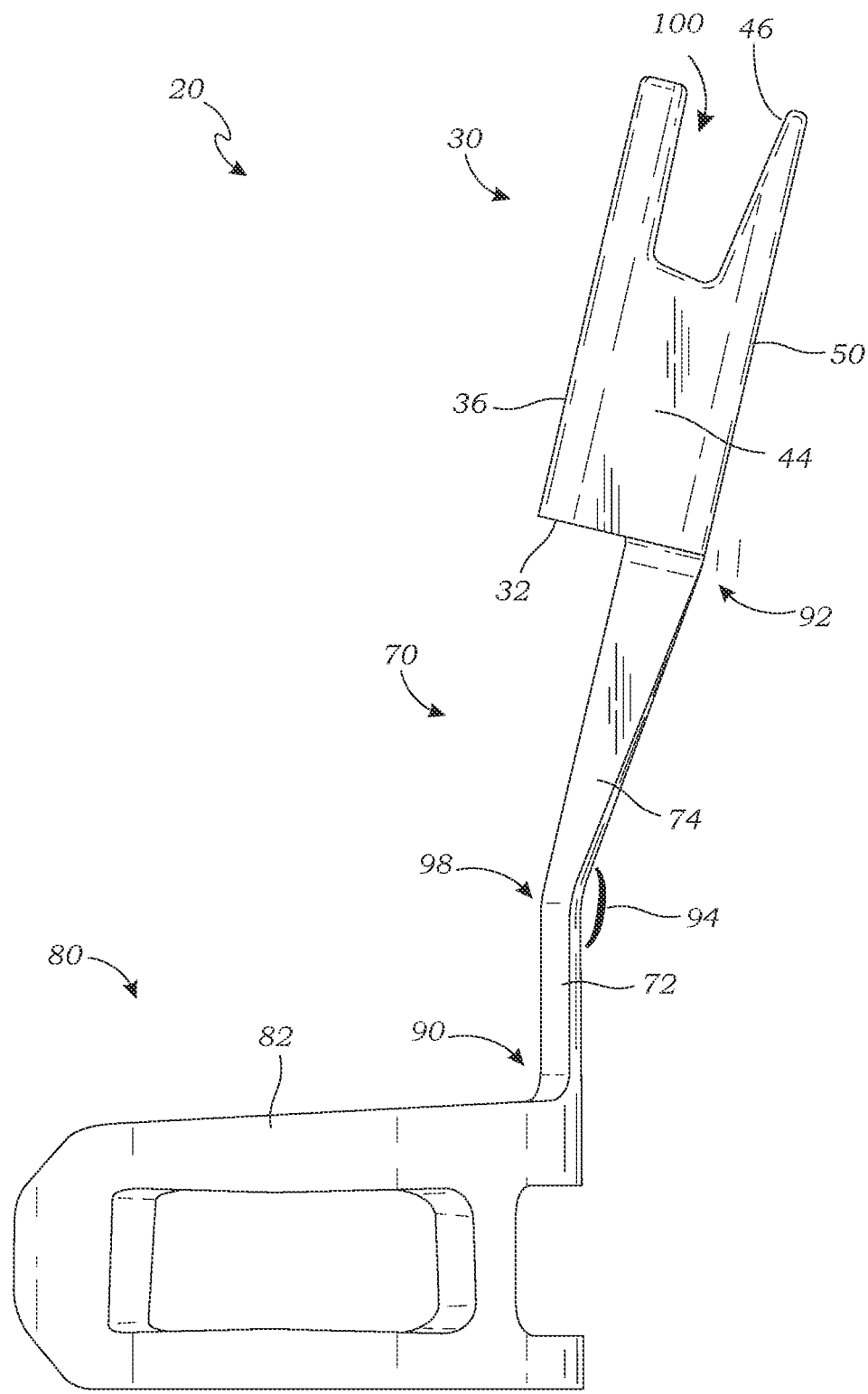
FIG. 5 is a side view of an exemplary embodiment of the retainer for the mobile device, in accordance with the present disclosure.

Referring to FIG. 5, a side view of the retainer 20 is provided. The arm 70 may interconnect the base 80 to the holder 30. The arm 70 may extend vertically upward from the base 80 to the holder 30, with the arm 70 supporting the holder 30, whereby the holder 30 is positioned over the base 80. The arm 70 may have an upper end 92, a lower end 90, and an intermediate portion 98, wherein the upper end 92 is distally located from the lower end 90, and the intermediate portion 98 is located at a position between the lower end 90 and the upper end 92. The base 80 may be connected to the arm 70 at the lower end 90, and the holder 30 may be connected to the arm 70 at the upper end 92, such that the arm 70 effectively interconnects the base 80 to the holder 30.

The intermediate portion 98 of the arm 70 may be located generally equidistant between the lower end 90 and the upper end 92, though the intermediate portion 98 may be located at a position more proximate to either the lower end 90 or the upper end 92. In some embodiments, the arm 70 may extend from the lower end 90 to the upper end 92 in a manner that is substantially vertical relative to the base 80, or otherwise in a manner that is substantially perpendicular with a plane defined by a surface of the open-sided resilient wall 82 of the base 80.

In optional embodiments, the arm 70 may consist of two members, a first member 72 and a second member 74, the first member 72 located proximately to the lower end 90 and the second member 74 located proximately to the upper end 92. The first member 72 and the second member 74 may be contiguous with one another, and in optional embodiments, the first member 72 may be removably attachable, or otherwise removably connected, to the second member 74. In embodiments where the first member 72 is removably connected to the second member 74, the first member 72 may be attached to the second member 74 on a portion of the arm 70 defined by the intermediate portion 98. By way of example, first member 72 may be removably connected to the second member 74 by any mechanical fit such as a friction fit, interference fit, slidable fit, rotatable fit, pivotable fit, and the like, or by other means of joining, such as tab-and-slot fit, click-and-pin fit, cantilever-and-latch fit, or buckle, and the like. By removably attaching the first member 72 to the second member 74, the base 80, which is connected to the first member 72 of the arm 70, may be separated from the holder 30, which is connected to the second member 74 of the arm 70. By removably detaching the base 80 from the holder 30, the retainer 20 may be effectively and compactly transported or packaged, given that the holder 30 (connected to the second member 74 of the arm 70) may be collapsed in, or juxtaposed with, the base 80 (connected to the first member 72 of the arm 70).

The arm 70 may have a bend formed in its profile, in a manner described as follows. The first member 72 may extend substantially vertical relative to the base 80, or otherwise in a manner that is substantially orthogonal or perpendicular with a plane defined by a surface of the open-sided resilient wall 82 of the base 30. The second member 74 may extend at an angle relative to the first member 72. The second member 74 may extend at an angle 94 ranging from about fifteen degrees (15°) to about twenty-five degrees (25°) relative to the first member 72. Those skilled in the art will appreciate that the retainer 20 thus allows for the holder 30 to be substantially offset from the base 80 such that the cylindrical volume above the base 80, and thus access to the base 80 and any container insert H in which the base 80 is installed, is not obstructed by the holder 30. In this way, with the holder 30 being substantially offset from the base 80, access to insert and remove the beverage container B in and from the container insert H (e.g., cup holder H) may not be obstructed by the holder 30. Advantageously, the second member 74 of the arm 70, and thus the angled orientation of the holder 30, may result in a user-friendly angle of any phone P inserted in the holder 30 during use of the retainer 20 such as while driving or acting as a passenger in a vehicle. It will be appreciated by those skilled in the art that the retainer 20 can otherwise vary in configuration from the exemplary embodiment shown and described, which is to be understood as illustrative and non-limiting. And once again, the drawings are to be understood as schematic in nature and are not to be taken literally or to scale in terms of absolute or relative sizing of the retainer 20 and its features, it being appreciated that the retainer 20 can be scaled or modified to suit various applications or uses without departing from the spirit and scope of the disclosure.

Figure 2:
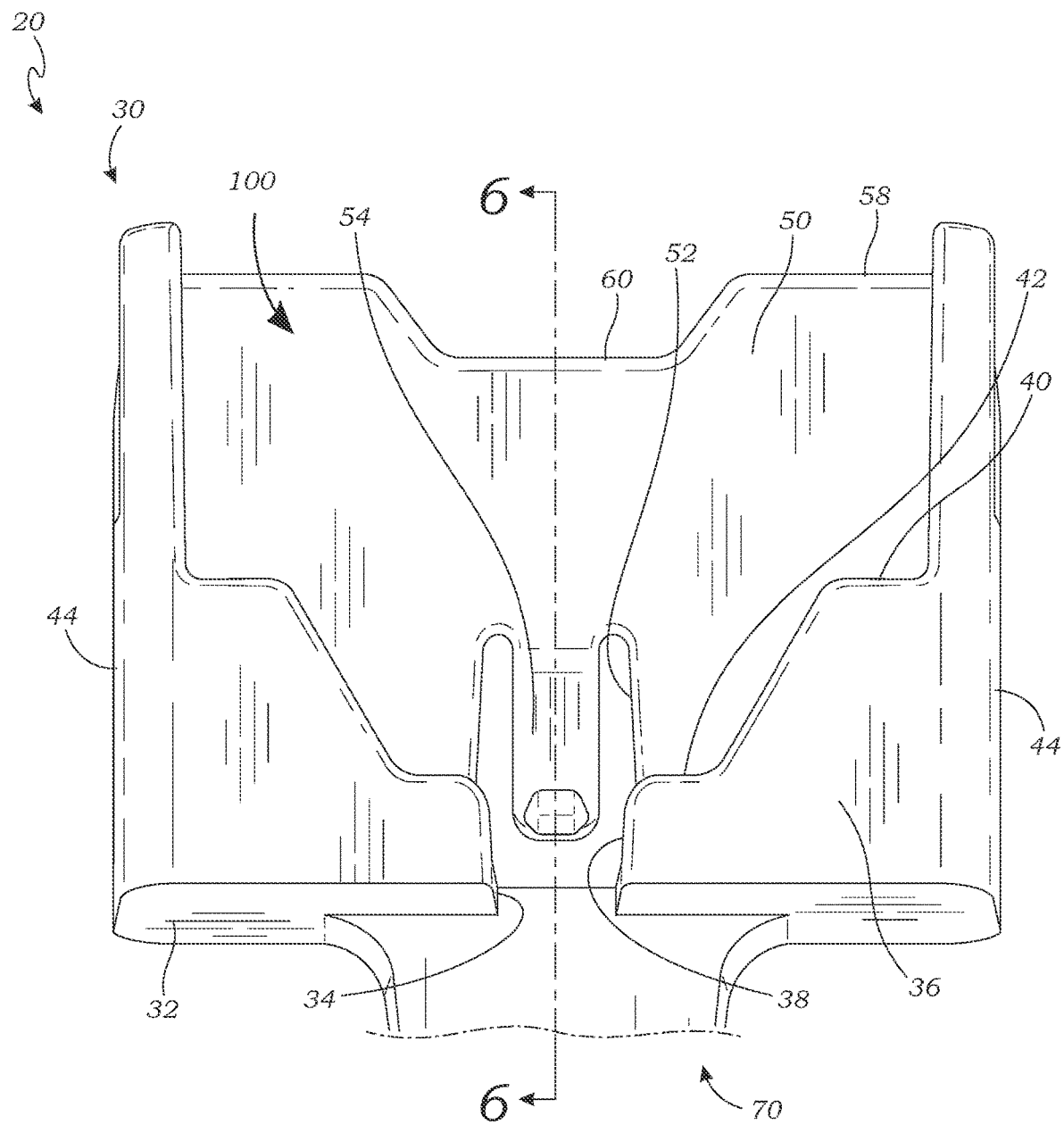
FIG. 2 is an enlarged partial front view of an exemplary embodiment of the retainer for the mobile device, in accordance with the present disclosure.
Figure 3:
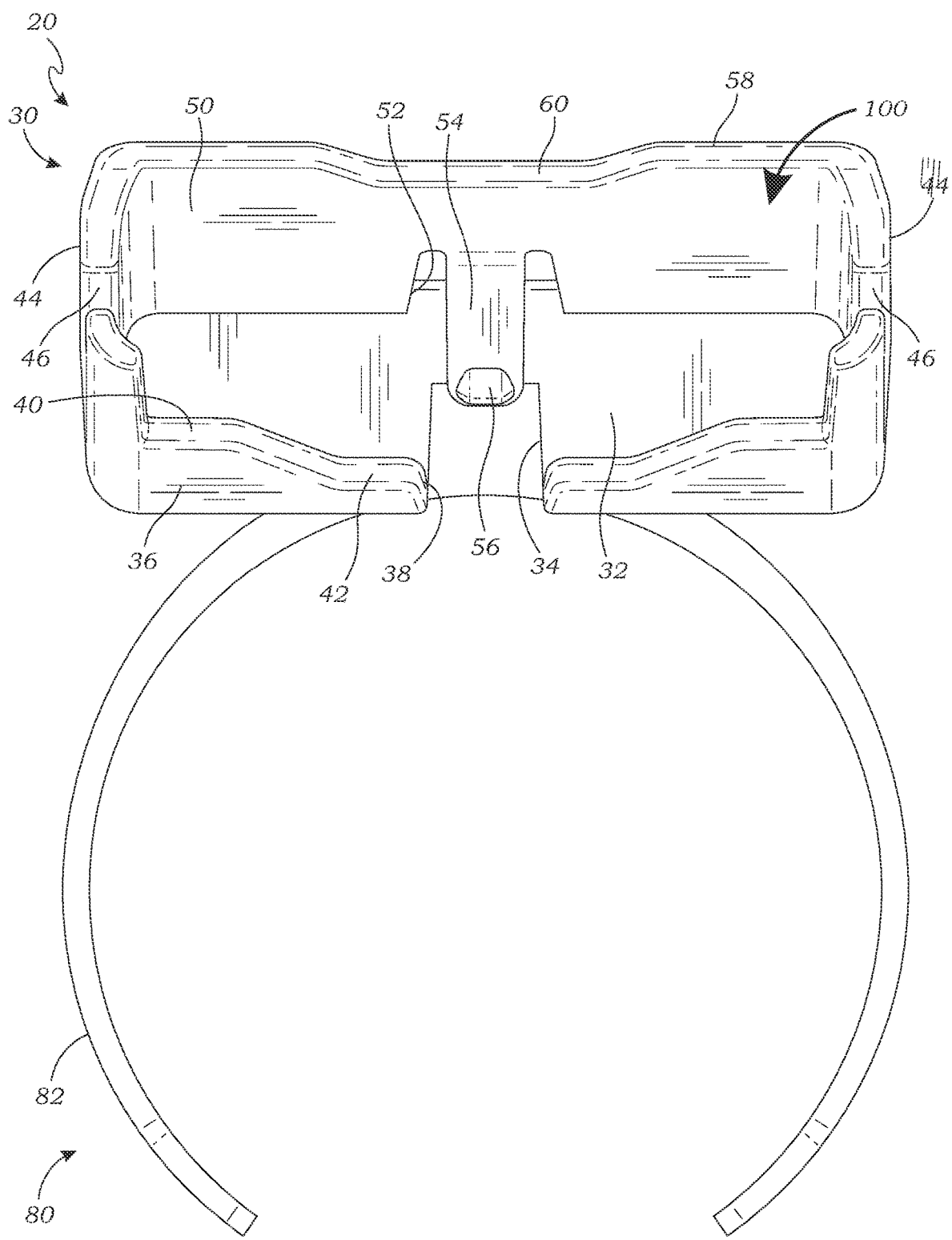
FIG. 3 is an enlarged top view of an exemplary embodiment of the retainer for the mobile device, in accordance with the present disclosure.
Figure 4:
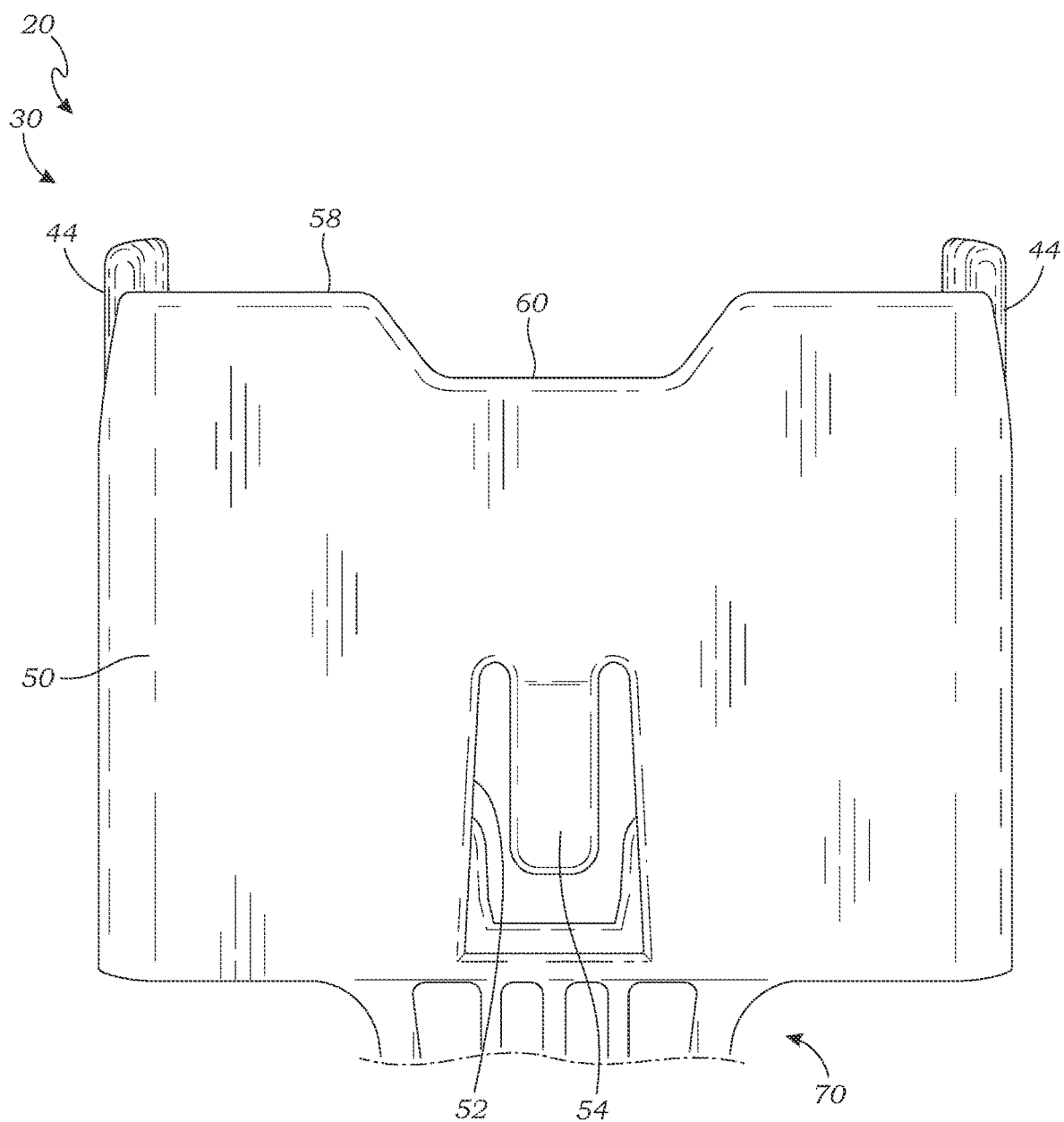
FIG. 4 is an enlarged partial rear view of an exemplary embodiment of the retainer for the mobile device, in accordance with the present disclosure.

Referring to FIGS. 2-4, provided are enlarged front, top, and rear views of the holder 30 of the cell phone retainer apparatus 20 according to aspects of the present disclosure. The holder 30 may include a bottom wall 32, a rear wall 50, and a front wall 36, and, in optional embodiments, the holder 30 may include side walls 44 (as further discussed below). The bottom wall 32 may act as a base for the holder 30, and, in optional embodiments, the bottom wall 32 may have a centered forwardly opening bottom wall notch 34. The front wall 36 may extend upwardly from the bottom wall 32, and the front wall 36 may have a centered front wall notch 38. The front wall notch 38 may intersect, and be generally coextensive, with the bottom wall notch 34, it being appreciated that the bottom and front wall notches 34, 38 thus cooperate in use to allow a charging or auxiliary cord or cable to be and remain plugged into a vertically oriented mobile device P, as depicted in FIG. 9 and FIG. 10, even as the mobile device P is placed in and removed from the holder 30. The front wall 36 may be relatively shorter than the rear wall 50, and may not only be bifurcated by the front wall notch 38 but also may have a front wall top edge 40. The front wall top edge 40 may be formed having a central front wall top edge dip 42, so as to define an even shorter central portion of the front wall 36, which it will be appreciated provides for sufficient structure or surface area for retention of mobile device P within the holder 30 while allowing for sufficient visibility of and access to the front screen of the mobile device P even while in the holder 30.

Figure 6:
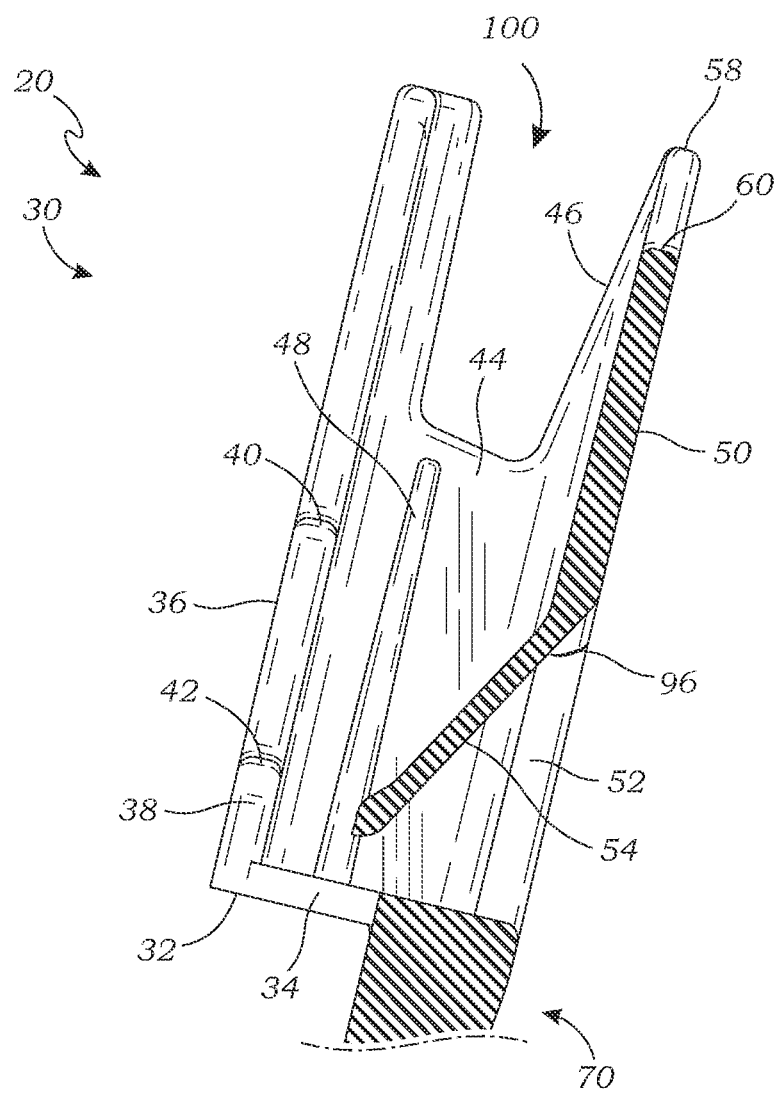
FIG. 6 is an enlarged cross-sectional partial side view of an exemplary embodiment of the retainer for the mobile device, as taken from line 6-6 of FIG. 2, in accordance with the present disclosure.

The holder 30 may further comprise side walls 44, such as left- and right-side walls 44, on opposite ends of the front wall 36, each of the side walls 44 also extending upwardly from the bottom wall 32. In optional embodiments, each side wall 44 may have an upwardly opening side wall notch 46 configured to receive and support or effectively cradle a mobile device P in a horizontal orientation. The side wall notches 46 may be slightly rearwardly angled to better position and support a horizontally-oriented mobile device P, as best seen in FIGS. 5 and 6, with a depth of the side wall notches 46 being sufficient to support and retain the mobile device P while again not significantly obstructing viewing of and access to the phone screen, even as the mobile device P is retained in the holder 30. In further optional embodiments, and as shown in FIG. 6 and FIG. 7, vertical side wall ribs 48 may be formed on inside surfaces of the side walls 44 extending up from the bottom wall 32 to add further structure for engagement with any mobile device P and/or phone case C inserted in the holder 30, here along the lower lengthwise edges thereof.

The holder 30 may further comprise a rear wall 50 opposite of the front wall 36, the rear wall 50 extending from the bottom wall 32. In embodiments in which the holder 30 comprises the side walls 44, the rear wall 50 may be interconnected to the front wall 36 by the side walls 44, such as left- and right-side walls 44. The rear wall 50 may be relatively taller than the front wall 36. Being generally analogous to the front wall 36, the rear wall 50 may have a rear wall top edge 58 formed centrally with a rear wall top edge dip 60. The rear wall 50 may have a rear wall notch 52 at its base adjacent to the bottom wall 32 and the notch 34. The bottom wall 32, the rear wall 50, and the front wall 36 may define a space 100, the space being configured to receive and retain the mobile device P. The space 100 may retain the mobile device P by having the mobile device P frictionally engaged to the bottom wall 32 with at least one or more of the front wall 36, the rear wall 50, or at least one of the opposite side walls 44.

In optional embodiments, extending from the top of the rear wall notch 52 and protruding downwardly and forwardly toward the bottom wall 32 and the front wall 36, or specifically, the bottom wall notch 34 and the front wall notch 38, may be a resilient retainer tab 54. When the space 100 receives the mobile device P, the resilient retainer tab 54 may be configured to frictionally engage a base or a bottom of the mobile device P inserted in the holder 30, or to gently squeeze or clamp the phone P between the resilient retainer tab 54 and the front wall 36. As best seen in the top view of FIG. 3, a nub 56 may be formed on a front-facing tip surface of the retainer tab 54 for further frictional engagement with a phone P when received by the space 100 of the holder H. Referring to FIGS. 1-4 and 6, the resilient retainer tab 54 may be formed within and extending from a clearance notch 52 formed in a base of the rear wall 50 so as to cooperate with the relatively shorter front wall 36 and the bottom wall 32, as shown and described in more detail further below in connection with FIGS. 8-10.

Figure 7:
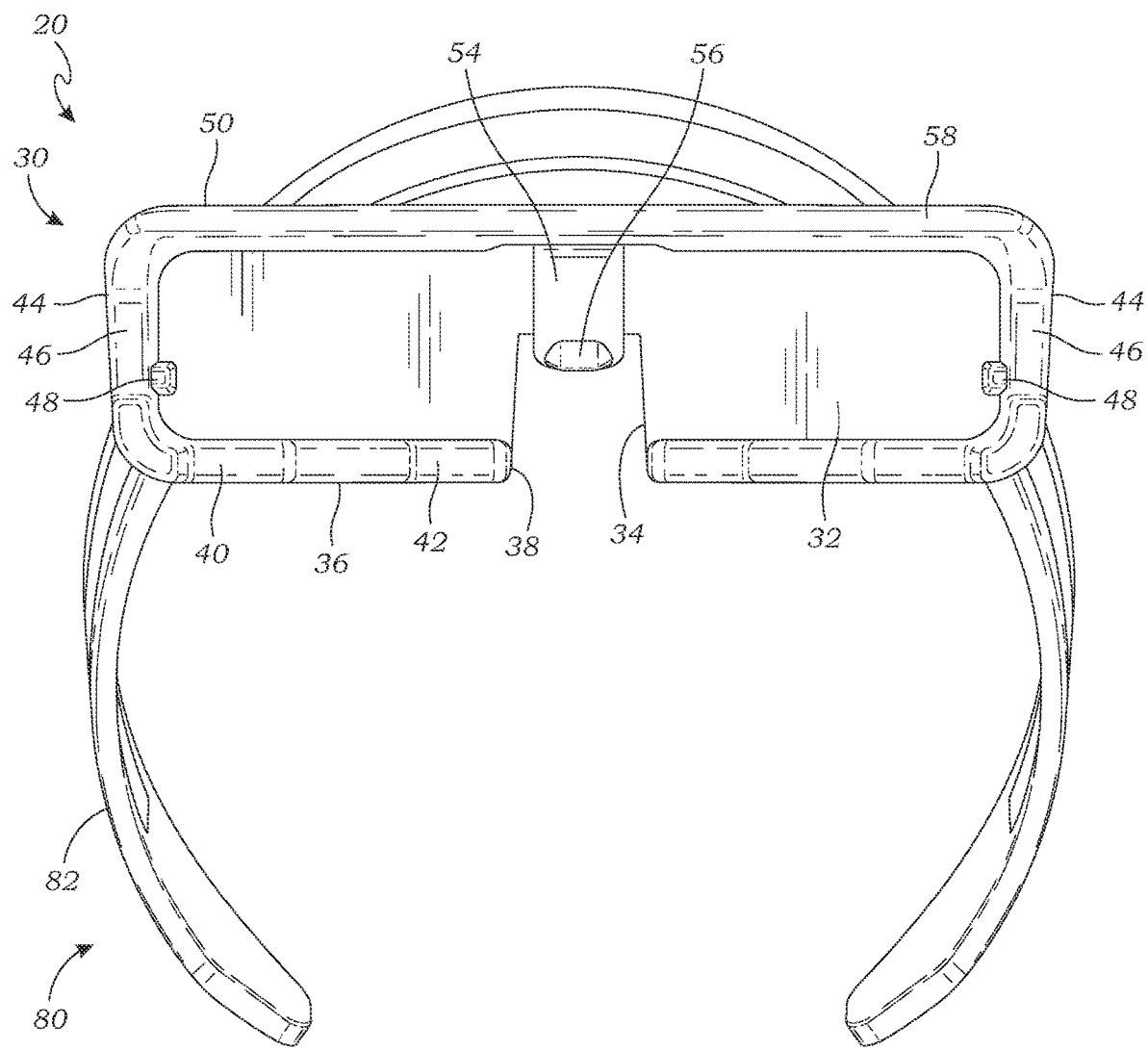
FIG. 7 is an enlarged top perspective view of an exemplary embodiment of the retainer for the mobile device, in accordance with the present disclosure.

With reference to FIGS. 1-4, the enlarged partial side cross-sectional view of FIG. 6, and the enlarged top perspective view of FIG. 7, the resilient retainer tab 54 may extend downwardly and forwardly from a top of the rear wall notch 52 at an angle relative to the rear wall 50 toward both the bottom wall 32 and the front wall 36 or more particularly the bottom notch 34 and the front wall notch 38. In the exemplary embodiment, the retainer tab 54 may be formed at an angle 96 of thirty degrees (30°) to the rear wall 50 in its at rest or unflexed position, as depicted in FIG. 6. As to a position of the resilient retainer tab, the resilient retainer tab 54 may extend into the space 100 at a point located generally halfway between the rear wall 50 and the front wall 36.

Dimensionally, and referring to the exemplary embodiment of the retainer 20 shown in FIGS. 1-10B, a base of the holder 50, or the inside dimensions of the bottom wall 32 as bounded by the front, side, and rear walls 36, 44, 50, may be approximately three-and-a-half inches (3.5 in.) wide by three-quarter inch (0.75 in.) long or deep, which "footprint" corresponds to the maximum widthwise profile of the mobile device P, or the mobile device P with case C (as depicted in FIGS. 9-10B) that may be received within the holder 50 in a vertical orientation. The overall height of the holder 50 may be approximately one-and-a-half inches (1.5 in.) tall at the top of the front wall 36 and approximately three inches (3 in.) at the tops of the side and rear walls 44, 50. And regarding the retainer tab 54, the retainer tab 54 may be approximately one inch (1 in.) long and three-eighth inch (0.375 in.) wide, extending from the top of the rear wall notch 52 that is approximately one-and-a-quarter inches (1.25 in.) tall measured from the bottom wall 32, with a thickness of approximately one-tenth inch (0.1 in.). As such, in the default or at rest position of the retainer tab 54, as shown in FIG. 6, the tip of the tab 54 or the end closest to the bottom and front walls 32, 36 may be approximately three-tenths inch (0.3 in.) from both an upper surface of the bottom wall 32 and a plane defined by an inside surface of the front wall 36. In those embodiments in which the holder comprises the resilient retainer tab 54, those skilled in the art may thus appreciate that for any mobile device P that is three-tenths inch (0.3 in.) thick or greater, when such mobile device P is inserted into the holder 50 in a vertical orientation, a bottom end of the mobile device P is pushed up against the inside of the front wall 36, or "kicked out" by the resilient retainer tab 54, so as to frictionally engage the mobile device P at its base between the retainer tab 54 and the front wall 36 while allowing the mobile device P to simply lean back against the rear wall 50 in being retained or seated within the holder 30, more about which is said below in connection with FIGS. 10A and 10B. As best seen in a rear view of the retainer 20 shown in FIG. 4, the rear wall notch 52 from which the retainer tab 54 extends, or is suspended, may be generally trapezoidal in profile, and may have an overall height of approximately one-and-a-quarter inches (1.25 in.) and being approximately three-quarter inch (0.75 in.) wide at its base and approximately two-third inch (0.67 in.) wide at its top.

Referring to FIGS. 6 and 7, the retainer tab nub 56 formed on a front-facing surface of the tip of the retainer tab 54 may be approximately one-quarter inch (0.25 in.) across and approximately one-tenth inch (0.1 in.) high and may be formed of the same or different material as the tab 54 itself, once again, just to provide additional surface-to-surface frictional engagement between the retainer tab 54 and the back of any mobile device P or phone case C inserted in the holder 30.

Regarding the resilient retainer tab 54, by being optionally formed as a molded plastic angled protrusion of a relatively small thickness, such as again approximately one-tenth inch (0.1 in.), extending from the top of the rear wall notch 52 and into the space 100 within the holder 30 bounded by the bottom wall 32, the front wall 36, the rear wall 50, and (in other embodiments) the sidewalls 44, it follows that the retainer tab 54 may flex down and back as force is applied to its front, particularly at its tip in the vicinity of the retainer tab nub 56, as by the mobile device P being inserted within the space 100 of holder 30, and then when such mobile device P is removed against the resistance provided by the resilient retainer tab 54, it may spring or flex back outwardly and upwardly to its unloaded or at rest position, acting as a natural biased spring. It may be appreciated that this structure and function or operation of the retainer tab 54 within the holder 30 is thus achieved without any separate or moving parts or assembly, improving the operation and reliability of the retainer 20 while reducing its cost and complexity.

Referring to FIGS. 8-9, in a typical vehicle V, such as an automobile or passenger car, truck, van, cart, or the like, and one or more container inserts H, or cup holders H, are provided for selective storage of and access to a beverage container B by a user, such as a driver or passengers, in, for example, a center console N of a vehicle V as illustrated. Advantageously, the base 80 of the retainer 20, with its open-sided resilient wall 82 (as depicted FIGS. 1, 3, and 5), may be inserted within such a vehicle cup holder H as shown, thus allowing for removable securement of the mobile device P within the holder 30, while still allowing receipt of the beverage container B within the cup holder H. And, with particular reference to the enlarged side cross-sectional views of FIGS. 10A and 10B, whether the mobile device P alone (as depicted in FIG. 10A), or the mobile device P with case C (as depicted in FIG. 10B) may be inserted in a vertical orientation within the holder 30, the downwardly-oriented resilient retainer tab 54 may flex at its tip as the retainer tab nub 56 makes contact with the bottom rear side of the mobile device P or case C to "kick out" a bottom end of the mobile device P or case C up against the inside of the front wall 36 by the resilient retainer tab 54, so as to frictionally engage the phone P or case C at its base between the retainer tab 54 and the front wall 36, such that the mobile device P or case C simply leans back at its top against the rear wall 50. Once again, those skilled in the art may appreciate that the mobile device P, with or without a case C, may be removably mounted within the holder 30 of the retainer 20 by simply being inserted into the space 100, or by otherwise being pushed down into the holder 30 so as to engage the resilient retainer tab 54, without having to operate any moving parts, buttons, levers, or the like and without needing to use both hands. The retainer 20 is thus safe and easy to use in selectively docking the mobile device P, or the like, while driving or otherwise operating a vehicle. And again, based on a geometry of the front wall 36 with its relatively shorter top edge 40 (and its central dip 42), the majority of a display or user interface of the mobile device P may be visible and accessible even while positioned within the holder 30. Moreover, the bottom and front wall notches 34, 38 may cooperate to allow a charging or auxiliary cord or cable to be and remain plugged into the mobile device P in a vertical orientation, even as the mobile device P is placed in and removed from the space 100 within the holder 30, once more rendering the retainer easy and effective and relatively universal in use.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

To facilitate the understanding of the embodiments described herein, a number of terms have been defined above (and below). The terms defined herein have meanings as commonly understood by a person of ordinary skill in the areas relevant to the present disclosure. The terminology herein is used to describe specific embodiments of the disclosure, but their usage does not delimit the disclosure, except as set forth in the claims.

The terms "attached," "connected," and "engaged," and the like, or any variation thereof, should generally be interpreted to mean any manner of joining two objects including, but not limited to, the use of any fasteners such as screws, nuts and bolts, bolts, pin and clevis, and the like allowing for a stationary, translatable, or pivotable relationship; welding of any kind such as traditional MIG welding, TIG welding, friction welding, brazing, soldering, ultrasonic welding, torch welding, inductive welding, and the like; using any resin, glue, epoxy, and the like; being integrally formed as a single part together; any mechanical fit such as a friction fit, interference fit, slidable fit, rotatable fit, pivotable fit, and the like; any combination thereof; and the like.

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" may include plural references, and the meaning of "in" may include "in" and "on." Further, ordinal indicators—such as "first," "second," "third," etc.—for identified elements are used to distinguish between the elements, and do not indicate or imply a required or limited number of such elements, and do not indicate a particular position or order of such elements unless otherwise specifically stated.

The phrase "in one embodiment," "in optional embodiments," or "in another embodiment," and variations thereof, as used herein, do not necessarily refer to the same embodiment, although it may. As used herein, the phrase "one or more of," when used with a list of items, means that different combinations of one or more of the items may be used and only one of each item in the list may be needed. For example, "one or more of" item A, item B, and item C may include, for example, without limitation, item A or item A and item B. This example also may include item A, item B, and item C, or item B and item C.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. The conditional language is not generally intended to imply that features, elements, and/or states are in any way required for one or more embodiments or that one or more embodiments necessarily include logic for deciding, with or without author input or prompting, whether these features, elements and/or states are included or are to be performed in any particular embodiment. Thus, such conditional language is not generally intended to imply that features, elements, and/or states are in any way required for one or more embodiments or that one or more embodiments necessarily include logic for deciding, with or without author input or prompting, whether these features, elements and/or states are included or are to be performed in any particular embodiment.

As used herein, the term "about" or "approximately," or the like, is used to mean approximately, roughly, around, or in the region of. When the term "about" is used in conjunction with a numerical range, it modifies that range by extending the boundaries above and below the numerical values set forth. In general, the term "about" is used herein to modify a numerical value above and below the stated value by a variance of twenty-five percent (25%) up or down (higher or lower), unless stated otherwise in the disclosure. Unless the context dictates the contrary, all ranges set forth herein should be interpreted as being inclusive of their endpoints and open-ended ranges should be interpreted to include only commercially practical values. The recitation of numerical ranges of values herein is merely intended to serve as a shorthand method of referring individually to each separate value falling within the range. Unless otherwise indicated herein, each individual value of a numerical range is incorporated into the specification as if it were individually recited herein. Similarly, all lists of values should be considered as inclusive of intermediate values unless the context indicates the contrary.

The previous detailed description has been provided for the purposes of illustration and description. Thus, although there have been described particular embodiments of a new and useful RETAINER FOR A MOBILE DEVICE AND METHOD OF USE THEREOF, it is not intended that such references be construed as limitations upon the scope of this disclosure except as set forth in the following claims. Thus, it is seen that the apparatus, methods, and/or systems of the present disclosure readily achieve the ends and advantages mentioned as well as those inherent therein. While certain preferred embodiments of the disclosure have been illustrated and described for present purposes, numerous changes in the arrangement and construction of parts and steps may be made by those skilled in the art, which changes are encompassed within the scope and spirit of the present disclosure as defined by the appended claims.

What is claimed is:

1. A retainer for a mobile device, the retainer comprising:
    a base defined by an open-sided resilient wall, the open-sided resilient wall capable of flexible and removable engagement to an internal surface of a container insert such that the container insert allows for removable receipt of a beverage container;
    an arm extending vertically upward from the base and supporting a holder, the holder positioned over the base;
    the holder having a bottom wall, a front wall extending upwardly from the bottom wall, a rear wall extending upwardly from the bottom wall opposite of the front wall, and opposite side walls extending upwardly from the bottom wall and interconnecting the front wall and the rear wall, wherein:
        the front wall has a front wall top edge defining a front wall height and the rear wall has a rear wall top edge defining a rear wall height, the rear wall height being greater than the front wall height; and
    the bottom wall, the front wall, the rear wall, and the opposite sidewalls defining a space, the space configured to receive and retain the mobile device by having the mobile device frictionally engaged to the bottom wall and at least one or more of the front wall, the rear wall, or at least one of the opposite side wall.

2. The retainer of claim 1, wherein:
    the open-sided resilient wall is formed in the shape of the letter "C."

3. The retainer of claim 1, wherein:
    the space is configured to receive and retain the mobile device in a vertical orientation.

4. The retainer of claim 1, wherein:
    each of the opposite side walls has an upwardly opening side wall notch configured to receive and retain the mobile device in a horizontal orientation.

5. The retainer of claim 4, wherein:
    the upwardly opening side wall notch of each of the opposite side walls are rearwardly angled in a direction of the rear wall.

6. The retainer of claim 1, wherein:
    each of the opposite side walls has a vertically inwardly projecting side wall rib extending upwardly from the bottom wall, whereby the projecting side wall rib of each of the opposite side walls allows for frictional engagement of the mobile device in the space.

7. The retainer of claim 1, wherein:
    the bottom wall has a forwardly opening bottom wall notch;
    the front wall has a front wall notch, the front wall notch intersecting and coextensive with the bottom wall notch; and
    the bottom wall notch and the front wall notch cooperate to allow for receipt of a cable in the space, the cable configured to be plugged into the mobile device when the mobile device is received and retained by the space in a vertical orientation.

8. A retainer for a mobile device, the retainer comprising:
    a base defined by an open-sided resilient wall, the open-sided resilient wall capable of flexible and removable engagement to an internal surface of a container insert such that the container insert allows for removable receipt of a beverage container;

an arm extending vertically upward from the base and supporting a holder, the holder positioned over the base;

the holder having a bottom wall, a front wall extending upwardly from the bottom wall, a rear wall extending upwardly from the bottom wall opposite of the front wall, wherein:

the front wall has a front wall top edge defining a front wall height and the rear wall has a rear wall top edge defining a rear wall height, the rear wall height being greater than the front wall height;

the rear wall has a rear wall notch adjacent to the bottom wall and a resilient retainer tab protruding forward forwardly and downwardly from the rear wall notch toward the bottom wall; and the bottom wall, the front wall, and the rear wall defining a space, the space configured to receive and retain the mobile device by having the resilient retainer tab engage a bottom end of the mobile device, such that the mobile device leans back against the rear wall and is frictionally engaged against the front wall.

9. The retainer of claim 8, wherein:
the open-sided resilient wall is formed in the shape of the letter "C."

10. The retainer of claim 8, wherein:
the resilient retainer tab extends into the space at a point located generally halfway between the rear wall and the front wall.

11. The retainer of claim 8, wherein:
the resilient retainer tab extends into the space at an angle of approximately thirty degrees (30°) relative to the rear wall.

12. The retainer of claim 8, wherein:
the resilient retainer tab is formed having a forwardly projecting retainer tab nub.

13. The retainer of claim 8, wherein:
the holder further comprises opposite side walls extending upwardly from the bottom wall and interconnecting the front wall and the rear wall; and
the bottom wall, the front wall, the rear wall, and the opposite side walls define the space.

14. A retainer for a mobile device, the retainer comprising:

an arm having an upper end and a lower end, the upper end of the arm distally located from the lower end of the arm;

a base connected to the arm at the lower end of the arm, the base defined by an open-sided flexible wall, the open-sided flexible wall capable of accommodating a perimeter of an internal surface of a container insert, such that the container insert allows for insertion and removal of a beverage container;

a holder connected to the arm at the upper end of the arm, the holder located above the base, the holder having a bottom wall, a front wall extending upwardly from the bottom wall, a rear wall extending upwardly from the bottom wall opposite of the front wall, and opposite side walls extending upwardly from the bottom wall and interconnecting the front wall and the rear wall, wherein the front wall has a height lesser than a height of the rear wall; and the bottom wall, the front wall, the rear wall, and the opposite sidewalls configured to receive the mobile device and further configured to retain the mobile device when the mobile device is frictionally engaged to the bottom wall and at least one or more of the front wall, the rear wall, or at least one of the opposite side walls.

15. The retainer of claim 14, wherein:
the open-sided flexible wall is formed in the shape of the letter "C."

16. The retainer of claim 14, wherein:
the arm extends from the lower end of the arm to the upper end of the arm in a manner substantially vertical relative to the base.

17. The retainer of claim 14, wherein:
the arm has a first member contiguously formed with a second member, the first member proximate to the lower end and the second member proximate to the upper end;
the first member extending substantially vertical relative to the base, and the second member extending at an angle relative to the first member.

18. The retainer of claim 17, wherein:
the second member extending at an angle ranging from about fifteen degrees (15°) to about twenty-five degrees (25°) relative to the first member.

19. A retainer for a mobile device, the retainer comprising:

an arm having an upper end, a lower end, and an intermediate portion, the upper end of the arm distally located from the lower end of the arm and the intermediate portion located between the lower end of the arm and the upper end of the arm, wherein:
the arm has a first member and a second member, the first member proximate to the lower end of the arm and the second member proximate to the upper end of the arm, and
the first member removably attached to the second member at the intermediate portion of the arm;

a base connected to the first member at the lower end of the arm, the base defined by an open-sided flexible wall, the open-sided flexible wall capable of accommodating a perimeter of an internal surface of a container insert, such that the container insert allows for insertion and removal of a beverage container;

a holder connected to the second member at the upper end of the arm, the holder located above the base, the holder having a bottom wall, a front wall extending upwardly from the bottom wall, a rear wall extending upwardly from the bottom wall opposite of the front wall, and opposite side walls extending upwardly from the bottom wall and interconnecting the front wall and the rear wall, wherein the front wall has a height lesser than a height of the rear wall; and the bottom wall, the front wall, the rear wall, and the opposite sidewalls configured to receive the mobile device and further configured to retain the mobile device when the mobile device is frictionally engaged to the bottom wall and at least one or more of the front wall, the rear wall, or at least one of the opposite side walls.

20. The retainer of claim 19 wherein:
the intermediate portion of the arm is located generally equidistant between the lower end of the arm and the upper end of the arm.

* * * * *